O. McQUILLAN & E. D. CHAITKEN.
CAR FENDER.
APPLICATION FILED JAN. 12, 1910.
962,041.
Patented June 21, 1910.
2 SHEETS—SHEET 1.
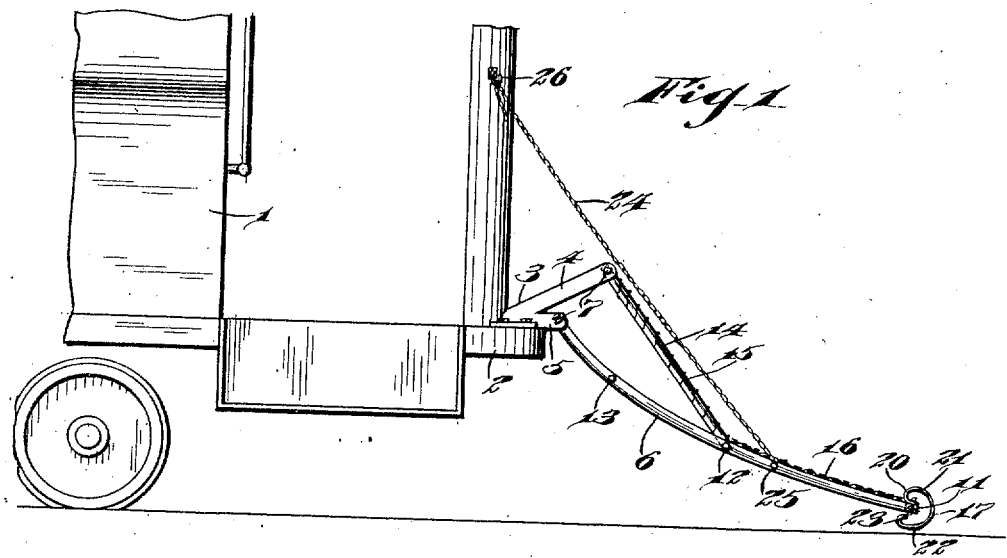
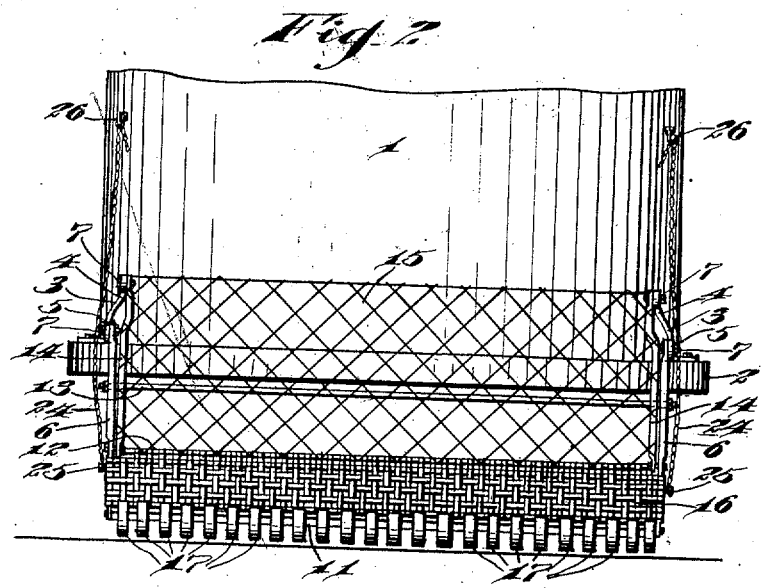

O. McQUILLAN & E. D. CHAITKEN.
CAR FENDER.
APPLICATION FILED JAN. 12, 1910.
962,041.
Patented June 21, 1910.
2 SHEETS—SHEET 2.
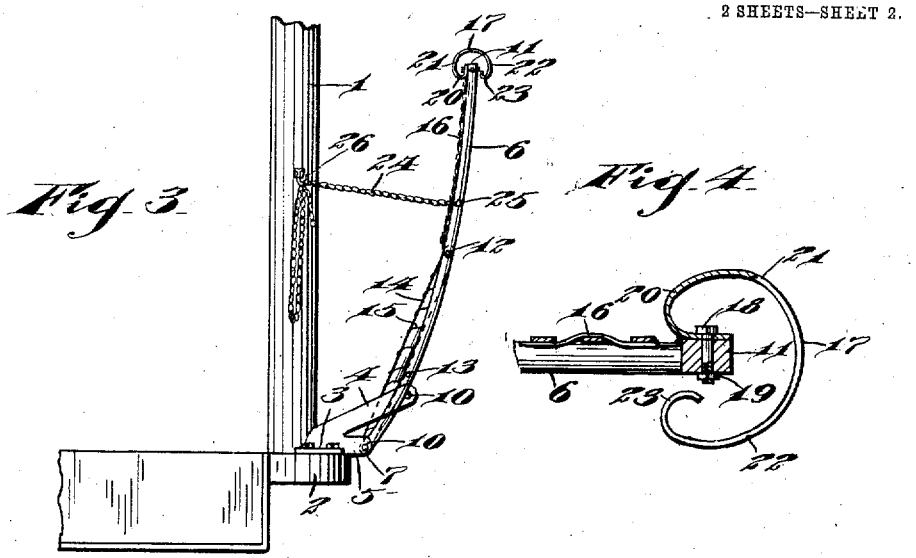
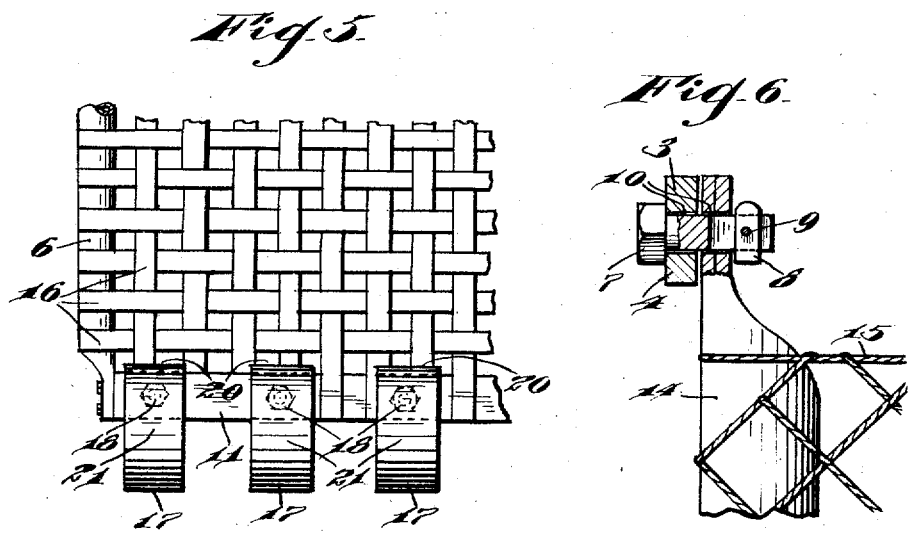
Witnesses
Inventors
Owen McQuillan
and Edmund D. Chaitken,
By Joshua R. H. Potts,
Attorney

UNITED STATES PATENT OFFICE.

OWEN McQUILLAN AND EDMUND D. CHAITKEN, OF PHILADELPHIA, PENNSYLVANIA.

CAR-FENDER.

962,041.

Specification of Letters Patent. Patented June 21, 1910.

Application filed January 12, 1910. Serial No. 537,714.

*To all whom it may concern:*

Be it known that we, OWEN McQUILLAN and EDMUND D. CHAITKEN, citizens of the United States, residing at Philadelphia, in the county of Philadelphia and State of Pennsylvania, have invented certain new and useful Improvements in Car-Fenders, of which the following is a specification.

Our invention relates to improvements in car fenders, the object of the invention being to provide an improved fender and an improved mounting therefor, which enables the free end of the fender to be supported close to the ground, so as to render it quite impossible for the fender to pass over an object, to cushion the contact of the fender with the object, and to compel the fender to ride over a raised cobble stone or other obstruction on the track, without injury to the fender.

A further object is to provide a fender with an improved arrangement of spring buffers at the forward cross bar of the fender which not only cushions contact with an object, but also serves to elastically ride the fender over a raised part of the track or ground.

With these and other objects in view the invention consists in certain novel features of construction and combinations and arrangements of parts, as will be more fully hereinafter described and pointed out in the claims.

In the accompanying drawings: Figure 1 is a view in side elevation illustrating our improved fender in operative position. Fig. 2 is a front view. Fig. 3 is a view similar to Fig. 1, but showing the fender in its elevated inoperative position. Fig. 4 is an enlarged view in longitudinal section at the forward end of the fender. Fig. 5 is an enlarged fragmentary plan view of a forward corner of the fender, and Fig. 6 is an enlarged view in sectional plan illustrating the pivotal attachment of one of the side members of the fender to the bracket.

1 represents the car and 2 the buffer bar at the forward end of the car to which two brackets 3, 3, are secured, said brackets each having two arms 4 and 5, and to the lower arms the side bars 6 of our improved fender are pivotally connected by means of bolts 7. These bolts 7 have heads at one end, and at their other ends are longitudinally grooved to accommodate a locking key 8, said key being pivotally supported in the groove by means of cross pin 9, and adapted when positioned longitudinally of the bolt, to permit the bolt to be readily inserted or removed, and when positioned at right angles to the bolt, to securely hold the bolt in place, yet permitting free pivotal movement of the side bars 6, it being understood of course, that the bolts are passed through openings 10 in the arms 5 and through openings in the bars 6 respectively. These bars 6 are connected at their forward ends by a cross bar 11, and between their ends by cross rods 12 and 13 respectively.

Rods 14 are pivotally supported at their forward ends on rod 12, and at their rear ends by means of bolts 7 as above described, which pivotally connects them with the arms 4 or brackets 3. These rods 14 are connected by a rope netting 15, and between rod 12 and bar 11, the bars 6 and said rods 12 and 11 are connected by an interlacing metal work 16, so as to form a cushioning or spring platform to receive an object thereon, while the netting 15 prevents the rearward movement of the object over the fender. To the cross bar 11 at the front end of the fender, a series of springs 17 are secured. These springs 17 each comprise a strip of spring metal bent as shown most clearly in Fig. 4. That is, one end of the spring is secured to the upper face of bar 11 by means of a bolt 18 and nut 19, and the spring strip then extends rearwardly and upwardly as shown at 20, thence forwardly and downwardly as shown at 21, thence around the front end of the fender and rearward as shown at 22, and thence again upward and forward as shown at 23. By this arrangement and shape of the spring the forward end of the fender is cushioned, so that when it strikes an object these springs 17 are sufficiently elastic to prevent damaging the object, and will simply trip up the person or object as the case may be, and deposit it gently on the metal work 16. The forward end of the fender may be positioned within an inch or so of the ground, and any obstruction in the track, such for example, as a raised cobble stone, will simply exert a cam action on some of the springs 17 to momentarily lift the fender, which will immediately fall back to normal position, and by curving the free ends of the springs upwardly and forwardly, any rearward movement of the fender against an obstruction will not be likely to injure the springs.

To regulate the height at which the fender is supported and to sustain the strain of any object deposited thereon, we provide chains 24, which are pivotally connected to bars 6, illustrated at points 25, and at their upper ends are adapted to be caught over hooks 26. The hooks 26 are secured to the dash board of the car and are sufficiently strong to sustain any strains or stresses that may come thereon, and by moving the chain so as to position the proper links in these hooks 26, just the proper adjustment of the fender may be had.

When it is desired to elevate the fender out of normal operative position, the bolts connecting rods 14 with the arms 4 are withdrawn so that the arms 14 will fall down upon the rod 13. The bolts are then returned to their position in arms 4 so as to be ready for future use and the fender is then swung up to the position shown in Fig. 3 and the chains shortened and the proper links caught in the hooks 26, which will hold the fender in this position.

If but a single fender is provided for a car, it will of course be necessary to provide brackets 3 at both ends of the car, when by removing the bolts 7, the fender may be placed at either end of the car as desired.

Various slight changes might be made in the general form and arrangement of parts described without departing from our invention, and hence we do not restrict ourselves to the precise details set forth, but consider ourselves at liberty to make such changes and alterations as fairly fall within the spirit and scope of the appended claims.

Having thus described our invention what we claim as new and desire to secure by Letters Patent is:—

1. A car fender comprising side bars, a cross bar connecting the forward ends of the side bars, object supporting means connecting the side bars and a series of springs secured to the cross bar, each spring secured to the upper face of the cross bar curving rearwardly and upwardly, thence forwardly and downwardly and thence rearwardly and upwardly, substantially as set forth.

2. The combination with a car, brackets secured to the car, each bracket having two arms, side bars pivotally connected to the lower arms of said brackets, rods connecting the side bars, a cross bar connecting the forward ends of the side bars, pivoted bars connected to one of said cross rods and pivotally connected at their rear ends to the other arms of said brackets, a flexible netting connecting the last mentioned bars, interlaced metal strips connecting the first mentioned bars at their forward ends, hooks on the car and chains connected to the first mentioned side bars and adapted to be caught by any of the links on said hooks.

3. The combination with a car, brackets on the car, each bracket having two arms, a car fender comprising side bars, bars pivotally connected to the said bars, object supporting means between said bars, and bolts pivotally connecting said bars with the said arms of the brackets, and each bolt having a head at one end and a groove at its other end, and a pivoted locking key in the groove of said bolt.

In testimony whereof we have signed our names to this specification in the presence of two subscribing witnesses.

OWEN McQUILLAN.
EDMUND D. CHAITKEN.

Witnesses:
CHAS. E. POTTS,
R. H. KRENKEL.